(No Model.)  3 Sheets—Sheet 1.

W. R. HINSDALE.
SYSTEM FOR DISPOSING OF SEWAGE.

No. 346,203.  Patented July 27, 1886.

Attest:
L. Lee
Henry J. Theberath.

Inventor:
William R. Hinsdale,
per Crane & Miller, Attys.

(No Model.) 3 Sheets—Sheet 2.
W. R. HINSDALE.
SYSTEM FOR DISPOSING OF SEWAGE.
No. 346,203. Patented July 27, 1886.
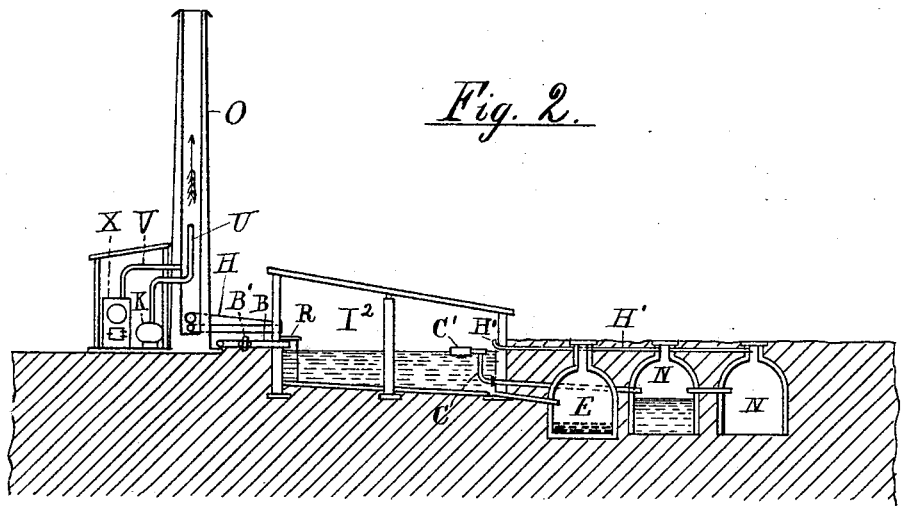
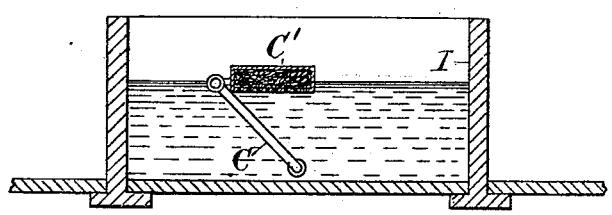
Attest:
L. Lee
Henry J. Theberath.
Inventor:
William R. Hinsdale
per Crane & Miller, Atty's (No Model.) 3 Sheets—Sheet 3.

W. R. HINSDALE.
SYSTEM FOR DISPOSING OF SEWAGE.

No. 346,203. Patented July 27, 1886.

Attest:
Inventor.
W. R. Hinsdale per
Crane & Miller, Attys.

UNITED STATES PATENT OFFICE.

WILLIAM R. HINSDALE, OF BROOKLYN, NEW YORK.

SYSTEM FOR DISPOSING OF SEWAGE.

SPECIFICATION forming part of Letters Patent No. 346,203, dated July 27, 1886.

Application filed October 6, 1885. Serial No. 179,169. (No model.)

*To all whom it may concern:*

Be it known that I, WILLIAM R. HINSDALE, a citizen of the United States, residing in Brooklyn, Kings county, New York, have invented certain new and useful Improvements in Systems for Disposing of Sewage, fully described and represented in the following specification and the accompanying drawings, forming a part of the same.

The object of this invention is to dispose of the sewage without detriment to health, and the system is based upon the principle that the sewage should be kept under control without exposure over an extended surface and rendered not only harmless, but to some extent of value by converting it immediately to useful purposes. It is also based upon the assumption that the surface-water and soil-drainage are disposed of by a system entirely distinct from that which handles the sewage matter.

My invention is intended to precipitate the sewage matter in suitable tanks arranged to be used alternately, and so connected with absorbent cesspools or other outlets that the clarified fluid can be decanted from the surface of the tank, whatever its level, without disturbing the sedimentary deposit. It is also intended to furnish a forced ventilation of the sewage works and the system of sewers connected therewith. It is also intended to convert the sludge into a compost or fertilizer of different character by the admixture with the sludge of absorbent materials having a value of their own as fertilizing agents. For this purpose I may use slaked lime, marl, or bone-dust, spent bone, charcoal, calcined plaster-of-paris, or uncalcined ground gypsum. My invention therefore includes a filter applied to the surface of the clarified liquid to drain the same continuously from the settling-tank, while such surface is gradually lowered by the removal of the fluid. It also includes an exhaust-blower connected with the sewer-pipes only, and discharging into a ventilating-chimney, the draft thus induced in the chimney being utilized to induce a ventilation of the sewage-tanks.

Figure 1:
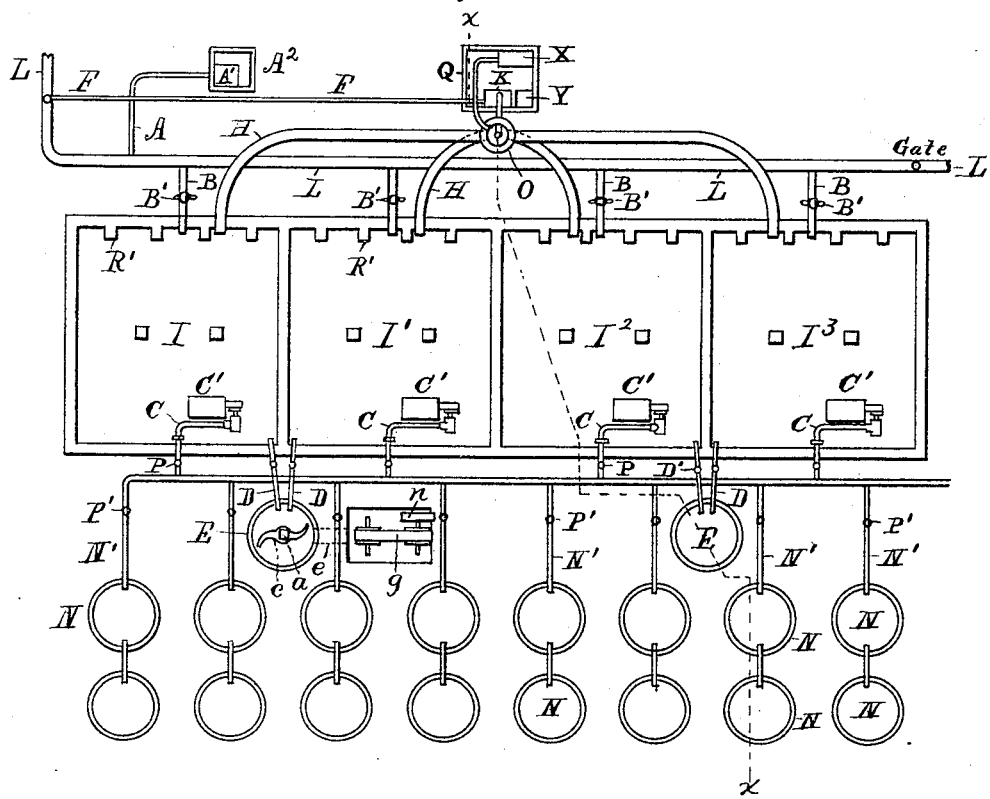
Figure 3:
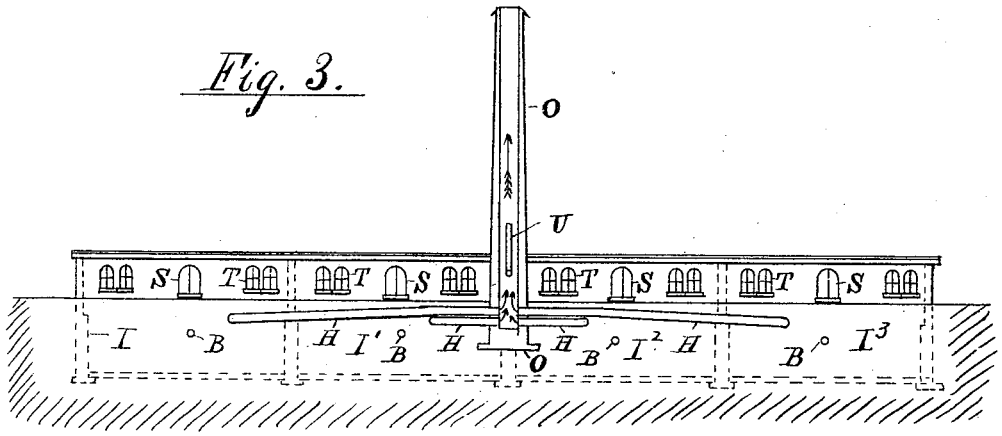
Figure 5:
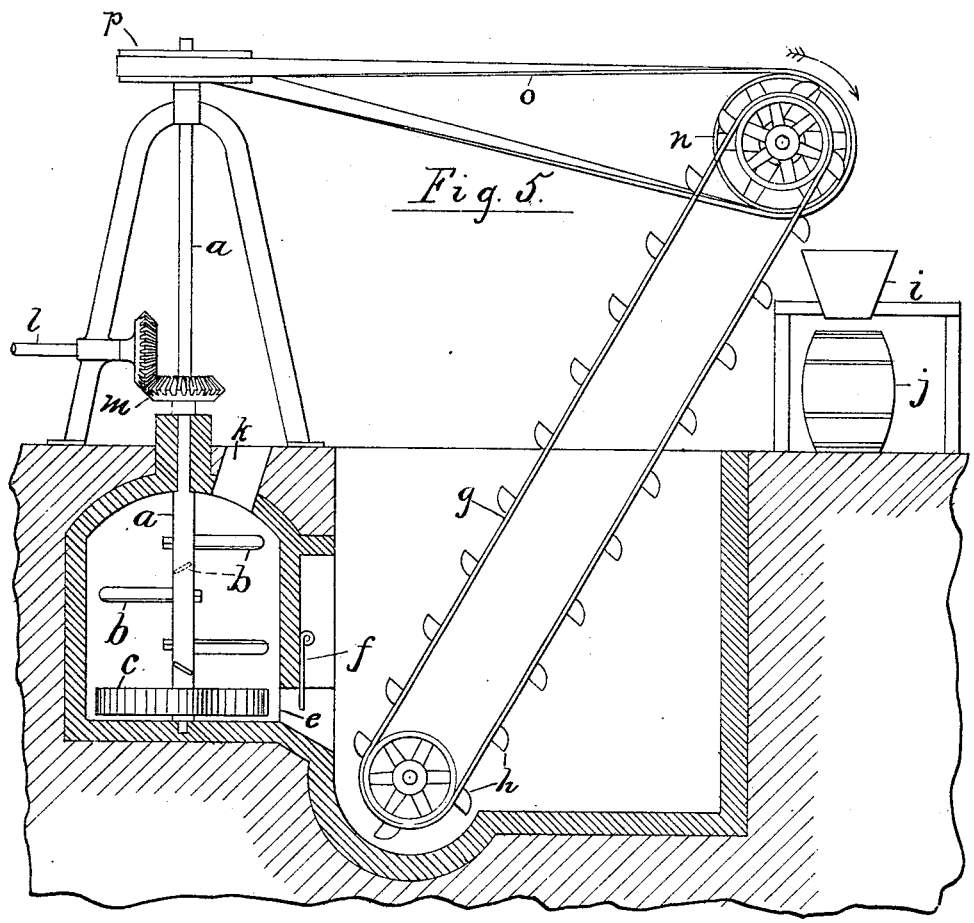

My improvements will be understood by reference to the annexed drawings, in which Figure 1 represents a plan of the sewage-works applied at the extremity of the main sewer, the roof of the settling-tanks being removed, and the various pipe-connections being shown as opening directly into the several receptacles and into one another. Fig. 2 represents a vertical cross-section of the works on line $x\ x$ in Fig. 1. Fig. 3 represents a rear elevation of the works with the chimney in section and the pipes H H exposed, to indicate the passages for the induced draft which ventilates the settling-tanks. Fig. 4 is a sectional elevation of one of the tanks I, showing the floating filter; and Fig. 5 is a vertical section, upon an enlarged scale, on line $z\ z$ in Fig. 1, of the sludge-pit and elevator connected therewith, this view showing the details of construction, which are entirely omitted from the other figures, Fig. 1 representing the cesspools, sludge-pits, and the various architectural structures merely in a ground plan, without projecting upon such plan any of their upper parts, as man-holes, covers, &c.

L represents the main sewer, which collects the sewage from a given section, and I I' I² I³ a series of settling-tanks, with which the sewer is connected by branches B, in which cocks B' B' are inserted.

A' is a pipe for feeding suitable chemicals into the sewage matter as it is passed to the tanks, to throw down the solid matter contained in the sewage, so that the clarified liquid may be separated therefrom.

N are absorbent cesspools connected with the settling-tanks by pipes N', the latter entering the tanks near the bottom, and being there provided with a hinged pipe, C, to the top of which is swiveled a floating filter, C', adapted to float upon the clarified fluid, and to discharge the same into the pipe C when the connecting-cock P' in the cesspool-pipes is opened.

E are cemented sludge-pits connected with the bottom of the tank by pipes D, having cocks D' inserted therein, and H are air-pipes connecting the upper parts of the cesspools N with the air-space under the roof J, over the settling-tanks. The walls of all the tanks are carried up to the roof, and the latter is sufficiently elevated above the fluid-level in the tanks to permit an operator to walk around upon a gallery, R, and to cleanse the interior of the tank by means of a hose, when empty.

R' are piers (shown in the plan) to strengthen the wall and support such gallery, and S, in Fig. 3, are doors leading through the outer wall to the gallery.

T are ventilator-openings by which the tanks are ventilated, in connection with pipes H, which are conducted to the base of the ventilating-chimney O.

Q is a building adapted to contain a boiler, engine, and exhaust-blower K, the suction side of the blower being connected to the main sewer-pipe L by a pipe, F, and the sewer-gas being discharged by the blower into the chimney by an upturned nozzle, U, to create a strong upward draft therein.

The operation of these devices is as follows: The pipes B permit the introduction of the sewage to each of the settling-tanks, and the first tank, as I, being filled, the gate B', connecting with the sewer-pipe L, is closed, and the gate to the next tank is opened, permitting the sewage to flow into the same, while the sewage in the first tank is allowed to remain during the period necessary to settle the solid matter in a sediment at the bottom of the tank, the required precipitation being effected by the introduction of suitable chemicals through the pipe A as the sewage passes to the tanks. The pipe A is shown in Fig. 1 connected to a chemical feeder, A', constructed to discharge the fluid at the desired rate, the feeder being located in a building, $A^2$. The use of such chemicals being well known for this purpose, I do not make any claim to their use herein. When the sewage in the first tank is properly clarified, the cock P, leading to the absorbent cesspools, is opened, and the clear fluid is allowed to pass through the filter C' and pipe C into the pipes N' to one or more of such cesspools, the filter being constructed in any convenient manner to admit the fluid to the pipes C, and to prevent the access of any floating particles which might clog such pipe. Such filter is shown herein as a box perforated upon the under side, which may be filled with straw or other fibrous material, and having an outlet into the pipe C below the surface of the fluid, so that the flow is voluntarily established as soon as the connection to the cesspools is opened. The filter is made sufficiently buoyant to sustain the pipe C, the hinge joint at the lower end of the pipe permitting the filter to descend as the level falls in the tank, and the operator closing the outlet-valve P when the clear liquid is entirely drawn off, and only the sludge remains in the bottom. If preferred, the cock P may be dispensed with and the pipe C be secured in an erect position until required for use, when the lowering of the pipe and the immersion of the filter in the surface of the liquid will suffice to discharge the fluid to the cesspools. Cocks P' may be applied in the pipes to the several cesspools, to cut any of them off from the system when repairs are required. The cock D' is then opened and the sludge discharged into the pit E, its flow from the tank being facilitated by the use of a small hose and a water-jet applied to the sides and bottom of the tank by a man upon the gallery. It is well known that the clear liquid separated from sewage by a careful precipitation may be discharged into streams of running water without any offensive or injurious results; and where such disposition of the fluid is possible, it would be employed in connection with the settling-tanks and ventilating devices shown herein. The absorbent cesspools shown herein may be used where the soil is porous, and where no running stream is available to receive the clarified liquid; and the sludge from the pits E may be removed by connecting a portable exhausted receiver thereto, and the contents of the pits may thus be removed and used as fertilizers without creating any offensive odor in their removal or transit. Four settling-tanks are shown herein at I I' $I^2$ $I^3$, and any number of such tanks may in practice be provided, of suitable capacity to receive the entire discharge from the sewer L, and to permit the contents of each tank to stand at rest during the necessary period for effecting the desired precipitation. It will be noticed that the exhaust-blower draws the gases only from the sewer-pipe L, the gates B' serving to prevent the passage of gas from the tanks through the pipes B, and the operation of the blower therefore being confined exclusively to the system of closed pipes which lead into the main sewer. The gas drawn from this source is discharged into the chimney at such a point as to create a strong upward draft, and to induce a suction in the pipes H which lead to the air-space above the fluid in the settling-tanks. This air-space being connected by pipes H' (which are shown only in Fig. 2) with the upper parts of the cesspools, the suction is extended to them also, and the gases are thus constantly drawn from the cesspools and the tanks by such induced draft. As the cubic capacity of the tanks and cesspools is quite large, compared to that of the sewer-pipes, it is obvious that the exhaust-blower will operate much more efficiently if used to ventilate all these receptacles by an induced draft than if it were connected directly with the tanks. It is necessary to ventilate each tank most thoroughly when it is entered by the operator to wash out the sludge, and I effect such result by closing the ventilator-openings T in all the other tanks at such time and admitting the air freely by the said openings in the settling-tank that is to be ventilated most efficiently. It is obvious that the induced draft in the pipes H would then operate chiefly within the settling-tank where the outer air was admitted; and that the gases would be speedily removed from such tank by the draft created therein toward the chimney O. If desired, gates can be inserted in the pipes H to shut off the suction from any of the tanks, and to concentrate it where desired; and it is also obvious that traps may be applied to the branches B, which connect the sewer L with the several tanks to prevent the blower-suction from operating upon the tanks through the said branches. By the use of such ventilating apparatus the gases are discharged at such an elevation above the ground as to be speedily diffused and rendered harmless, and the discharge of the gases from the chimney and their dispersion to a higher level may be still further promoted by discharging heated air into the chimney, as by pipe V from the furnace X, which is used to drive the engine Y and blower K.

The means for thickening the sludge and fitting it for transportation is shown in Fig. 5, and consists first in mixing ground gypsum or other absorbent substances with the sludge in the pit to which it is discharged from the settling-tank. To effect such mixing, the sludge-pit is provided with a stirring-shaft, $a$, having mixing-blades $b$, preferably made of flat bars twisted, of various angles to a horizontal plane, so as to move the mass upward and downward within the pit during the stirring operation, to fully incorporate its ingredients. The stirring-shaft is represented as driven by a driving-shaft, $l$, and bevel-wheels $m$, which may be done when steam-power is available for the purpose, or horse-power, or any other agency may be employed. A pulley, $n$, is shown upon the upper elevator-shaft and driven by a bolt, $o$, from a pulley, $p$, upon the stirring-shaft; but other means may be used to operate the elevator, as such construction forms no part of my invention. A man-hole, $k$, is provided in the top of the pit to pour in the absorbent materials, and a discharge-outlet, $e$, provided with a door or gate, $f$, is formed at the bottom of the pit, and a wiper, $c$, affixed to the shaft, serves to discharge the compost from such outlet when opened. An elevator consisting of a chain or bolt, $g$, carrying buckets $h$, is mounted adjacent to the sludge-pit, to elevate its contents from the outlet $e$ to a platform upon the level of the ground, where the compost may be discharged through a chute, $i$, directly into a barrel, as shown in Fig. 5. The chemical construction of such compost may be obviously varied by the introduction of suitable ingredients during the mixing operation, and the product be thereby adapted for fertilizing a variety of soils or crops. The elevator may also be used to discharge the compost in a bin, from which it can be shoveled into wagons or cars for transportation in bulk.

By the use of the entire apparatus for separating the solid and fluid parts of the sewage it will be seen that the process can be conducted entirely in closed receptacles, which are ventilated in such a manner as to prevent the escape of any noxious gases, and the entire operation is thus effected without contaminating the surrounding atmosphere or injuriously affecting the health of the operator employed.

By the use of my apparatus the sludge may be utilized without the admixture of other substances where there are agricultural purposes to which it may be adapted adjacent to the works, while my system also provides a means of converting a sludge into a valuable fertilizer convenient for transportation.

It will be noticed that any fertilizing agents that may be mixed with the sludge to absorb its superfluous moisture impart an additional value to the compost, which is precisely equal to their own fertilizing properties. Such materials as bone-dust and lime-phosphate may therefore be used to neutralize the moisture of the sludge, and render the mixture fit for transportation, with the certainty that the fertilizing value of the compost will be greater than the initial cost of any such absorbent material.

Having thus set forth the nature and objects of my invention, I claim my specific improvements in the following manner:

1. In a system for disposing of sewage, the combination, with a sewer-branch, B, of a settling-tank, I, a filter, C', applied to the surface of the tank's contents, and a pipe-connection from such filter, arranged and operated to discharge the clarified liquid from the filter, substantially as herein set forth.

2. The combination, with a sewer-branch, B, of a settling-tank, I, a floating filter, C', applied to the surface of the tank's contents, and absorbent cesspools for receiving the clarified liquid, and a pipe-connection from such filter, arranged and operated to discharge the liquid into the cesspools, substantially as herein set forth.

3. The combination, with a sewer, of a settling-tank, I, a sludge-pit, E, one or more absorbent cesspools, N, a floating filter and suitable connections for drawing off the clarified liquid to the cesspools, and a connection from the bottom of the settling-tank to the sludge-pit, the cesspool and sludge-pit being closed to prevent the escape of gases, substantially as herein set forth.

4. The combination, with a main sewer, L, of a series of settling-tanks connected therewith by branches B and gates B', each settling-tank being connected at its bottom with a sludge-pit, and provided with a floating filter, and pipe-connections from said filter to a series of absorbent cesspools connected with the other tanks, substantially as herein set forth.

5. The combination, with a main sewer, L, and a series of inclosed or covered settling-tanks connected thereto by branches and gates, as described, of an exhaust-blower drawing its suction from the main sewer only, and a ventilating-chimney receiving the gases discharged from the blower, substantially as shown and described.

6. The combination, with a main sewer, L, of a series of inclosed or covered tanks connected thereto by branches and gates, as described, and provided with adjustable ventilating-openings, a ventilating-chimney, O, a pipe, H, connecting each tank with the chimney, an exhaust-blower drawing its suction from the main sewer only, and discharging the gases into the chimney to induce a draft in the pipes H, and thereby ventilating the tanks indirectly, substantially as shown and described.

7. The combination, with a main sewer, L, of a series of covered settling-tanks connected thereto by branches and gates, as described, a series of absorbent cesspools connected with the tanks to receive the clarified liquid, ventilating-pipes connecting the cesspools with the air-space above the tanks, ventilating-chimney O, pipes H, connecting the chimney with said air-space, and an exhaust-blower drawing its suction from the sewer only and discharging into the chimney only, substantially as shown and described.

8. In a sewage-works, the combination, with a settling-tank, of a pit adapted to receive the sludge therefrom, and a stirring device applied to the pit to mix other ingredients with the sludge, substantially as shown and described.

9. In a sewage-works, the combination, with a settling-tank, of a pit adapted to receive the sludge therefrom, a stirring device applied to the pit, an outlet at the bottom of the pit, and a wiper to discharge the compost through the outlet, substantially as shown and described.

10. In a sewage-works, the combination, with a settling-tank, of a pit adapted to receive the sludge therefrom, a stirring device applied to the pit, and an elevator arranged and operated to raise the compost and discharge it into a suitable receptacle, substantially as shown and described.

In testimony whereof I have hereunto set my hand in the presence of two subscribing witnesses.

WILLIAM R. HINSDALE.

Witnesses:
  THOS. S. CRANE,
  L. LEE.